(12) United States Patent
Kang

(10) Patent No.: US 11,670,290 B2
(45) Date of Patent: Jun. 6, 2023

(54) SPEECH SIGNAL PROCESSING METHOD AND APPARATUS

(71) Applicant: Samsung Electronics Co., Ltd., Suwon-si (KR)

(72) Inventor: Tae Gyoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 17/106,599

(22) Filed: Nov. 30, 2020

(65) Prior Publication Data

US 2022/0020362 A1 Jan. 20, 2022

(30) Foreign Application Priority Data

Jul. 17, 2020 (KR) ........................ 10-2020-0088919

(51) Int. Cl.
*G10L 15/197* (2013.01)
*G10L 15/22* (2006.01)
*G06N 3/08* (2023.01)
*G10L 15/16* (2006.01)
*G06N 3/045* (2023.01)

(52) U.S. Cl.
CPC ............ *G10L 15/197* (2013.01); *G06N 3/045* (2023.01); *G06N 3/08* (2013.01); *G10L 15/16* (2013.01); *G10L 15/22* (2013.01)

(58) Field of Classification Search
CPC ....... G10L 15/197; G10L 15/16; G10L 15/22; G06N 3/08; G06N 3/0454
See application file for complete search history.

(56) References Cited

U.S. PATENT DOCUMENTS

| 9,064,493 | B2 * | 6/2015 | Ganong, III | ............ G10L 15/01 |
| 9,728,185 | B2 | 8/2017 | Schalkwyk et al. | |
| 10,134,425 | B1 | 11/2018 | Johnson, Jr. | |
| 10,573,312 | B1 * | 2/2020 | Thomson | ............ G10L 15/187 |
| 11,437,027 | B1 * | 9/2022 | Guo | ......................... G10L 15/22 |
| 2009/0234650 | A1 * | 9/2009 | Yano | ......................... G10L 15/22 |
| | | | | 704/E15.005 |

(Continued)

FOREIGN PATENT DOCUMENTS

| AU | 2018266284 B2 * | 10/2020 | ............... G06F 3/16 |
| DE | 112010005802 T5 * | 5/2013 | ............. G06F 3/167 |

(Continued)

OTHER PUBLICATIONS

Hannun, Awni, et al., "Sequence-to-Sequence Speech Recognition with Time-Depth Separable Convolutions." arXiv preprint arXiv:1904.02619, Apr. 4, 2019 (pp. 1-5).

(Continued)

*Primary Examiner* — Mohammad K Islam
(74) *Attorney, Agent, or Firm* — NSIP Law

(57) ABSTRACT

A speech signal processing method and apparatus is disclosed. The speech signal processing method includes receiving an input token that is based on a speech signal, calculating first probability values respectively corresponding to candidate output tokens based on the input token, adjusting at least one of the first probability values based on a priority of each of the first probability values, and processing the speech signal based on an adjusted probability value obtained by the adjusting.

23 Claims, 6 Drawing Sheets

(56) References Cited

U.S. PATENT DOCUMENTS

| | | | |
|---|---|---|---|
| 2015/0248883 A1* | 9/2015 | Ganong, III | G10L 15/1815 |
| | | | 704/251 |
| 2015/0340034 A1 | 11/2015 | Schalkwyk et al. | |
| 2016/0104481 A1 | 4/2016 | Ehsani et al. | |
| 2017/0256258 A1 | 9/2017 | Froelich | |
| 2019/0043476 A1* | 2/2019 | Hofer | G10L 15/01 |
| 2019/0057683 A1* | 2/2019 | Sak | G10L 15/16 |
| 2019/0325898 A1 | 10/2019 | Kinney et al. | |
| 2019/0333507 A1 | 10/2019 | Kim et al. | |
| 2019/0348065 A1 | 11/2019 | Talwar et al. | |
| 2019/0362741 A1 | 11/2019 | Li et al. | |
| 2020/0118544 A1* | 4/2020 | Lee | G10L 15/063 |
| 2020/0184959 A1* | 6/2020 | Yasa | G10L 15/1815 |
| 2021/0375272 A1* | 12/2021 | Madwed | G10L 25/63 |

FOREIGN PATENT DOCUMENTS

| | | | | |
|---|---|---|---|---|
| DE | 112017003563 T5 * | 5/2019 | | G10L 15/08 |
| DE | 102019207712 A1 * | 12/2019 | | G10L 15/16 |
| DE | 102020202489 A1 * | 10/2020 | | G06N 3/0454 |
| EP | 0955628 A2 * | 5/1999 | | |
| EP | 0896320 A2 * | 8/1999 | | |
| EP | 3520036 B1 * | 7/2020 | | G06F 40/47 |
| JP | H11501410 A * | 3/1996 | | G10L 15/01 |
| JP | 4322934 B2 | 9/2009 | | |
| JP | 4836290 B2 | 12/2011 | | |
| JP | 6563080 B2 | 8/2019 | | |
| WO | WO-2004034378 A1 * | 4/2004 | | G06F 17/2715 |
| WO | WO-2011016129 A1 * | 2/2011 | | G10L 15/32 |
| WO | WO-2011052412 A1 * | 5/2011 | | G10L 15/02 |
| WO | WO-2018047421 A1 * | 3/2018 | | G10L 15/02 |
| WO | WO-2020044755 A1 * | 3/2020 | | |
| WO | WO-2021144901 A1 * | 7/2021 | | |

OTHER PUBLICATIONS

Keung, Phillip, et al., "Attentional Speech Recognition Models Misbehave on Out-of-domain Utterances." arXiv preprint arXiv:2002.05150, Feb. 12, 2020 (pp. 1-5).

* cited by examiner

SPEECH SIGNAL PROCESSING METHOD AND APPARATUS

CROSS-REFERENCE TO RELATED APPLICATIONS

This application claims the benefit under 35 USC § 119(a) of Korean Patent Application No. 10-2020-0088919 filed on Jul. 17, 2020, in the Korean Intellectual Property Office, the entire disclosure of which is incorporated herein by reference for all purposes.

BACKGROUND

1. Field

The following description relates to a speech signal processing method and apparatus.

2. Description of Related Art

A neural language model may be trained only with a text, which is an advantage. However, since it is trained only with a text, there may be a mismatch that inevitably occurs due to a speech signal being overlooked.

One such issue may be deletion error. Because the language model has no audio information, it may recognize a portion in which a single sentence is grammatically completed as an end of an actual sentence with an increasing probability. Therefore, it may allow speech recognition to be terminated before the actual sentence is finished.

In addition, the language model may not have a token that is present in a speech recognition model, for example, a cough sound or a mere sound such as "hmm," according to a transcription rule. Thus, the language model may not calculate a suitable probability for such a sound.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a speech signal processing method, including receiving an input token that is based on a speech signal, calculating first probability values respectively corresponding to candidate output tokens based on the input token, adjusting at least one of the first probability values based on a priority of each of the first probability values, and processing the speech signal based on an adjusted probability value obtained by the adjusting.

The adjusting may include determining whether a first probability value corresponding to a first candidate output token from among the candidate output tokens is included in a predetermined priority, and adjusting the first probability value based on a result of the determining.

The first candidate output token may be a token corresponding to an end of a sentence.

The adjusting of the first probability value based on the result of the determining may include decreasing the first probability value, in response to the first probability value not being included in the predetermined priority.

The decreasing of the first probability value may include adjusting a logarithmic value of the first probability value to negative infinity.

The processing may include outputting a text based on the speech signal.

The processing may include calculating second probability values respectively corresponding to candidate output tokens based on the input token, and determining an output token based on the first probability values and the second probability values.

The determining may include obtaining a weighted sum of each of the first probability values and each of the second probability values, and determining, to be the output token, a candidate output token having a greatest weighted sum from among the candidate output tokens.

In another general aspect, there is provided a speech signal processing apparatus, including a receiver configured to receive an input token that is based on a speech signal, and a processor configured to calculate first probability values respectively corresponding to candidate output tokens based on the input token, adjust at least one of the first probability values based on a priority of each of the first probability values, and process the speech signal based on an adjusted probability value obtained by the adjusting.

The processor may be configured to determine whether a first probability value corresponding to a first candidate output token from among the candidate output tokens is included in a predetermined priority, and adjust the first probability value based on a result of the determining.

The first candidate output token may be a token corresponding to an end of a sentence.

The processor may be configured to decrease the first probability value, in response to the first probability value not being included in the predetermined priority.

The processor may be configured to adjust a logarithmic value of the first probability value to negative infinity.

The processor may be configured to output a text based on the speech signal.

The processor may be configured to calculate second probability values respectively corresponding to candidate output tokens based on the input token, and determine an output token based on the first probability values and the second probability values.

The processor may be configured to obtain a weighted sum of each of the first probability values and each of the second probability values, and determine, to be the output token, a candidate output token having a greatest weighted sum among the candidate output tokens.

In another general aspect, there is provided a speech signal processing method, including receiving an input token that is based on a speech signal, calculating first probability values respectively corresponding to first candidate output tokens based on the input token, calculating second probability values respectively corresponding to second candidate output tokens based on the input token, generating a nonverbal token and a probability corresponding to the nonverbal token based on at least one of the first probability values and the second probability values, and processing the speech signal based on the probability corresponding to the nonverbal token.

The generating may include duplicating, into the second candidate output tokens, a nonverbal token included in the first candidate output tokens, and duplicating, into the second probability values, a probability corresponding to the nonverbal token and included in the first probability values.

The generating may include duplicating, into the second candidate output tokens, a nonverbal token included in the first candidate output tokens, and mapping a greatest value among the second probability values to a probability corresponding to the duplicated nonverbal token.

The speech signal processing method may include determining whether the nonverbal token is registered among the second candidate output tokens.

In another general aspect, there is provided a speech signal processing method, including receiving an input token that is based on a speech signal, determining, using a first neural network, first probability values respectively corresponding to first candidate output tokens based on the input token, determining, using a second neural network, second probability values respectively corresponding to second candidate output tokens based on the input token, determining whether a first probability value corresponding to a first candidate output token from among the first candidate output tokens is included in a predetermined priority, obtaining a weighted sum of each of the first probability values and each of the second probability values, in response to the first probability value being included in the predetermined priority, and processing the speech signal based on the weighted sum to output a text, wherein the first neural network is based on a language model, and the second neural network is based on a speech recognition model.

The speech signal processing method may include adjusting a logarithmic value of the first probability value to negative infinity, in response to the first probability value not being included in the predetermined priority.

The speech signal processing method may include adjusting at least one of the first probability values based on a priority of each of the first probability values.

Other features and aspects will be apparent from the following detailed description, the drawings, and the claims.

Figure 1:
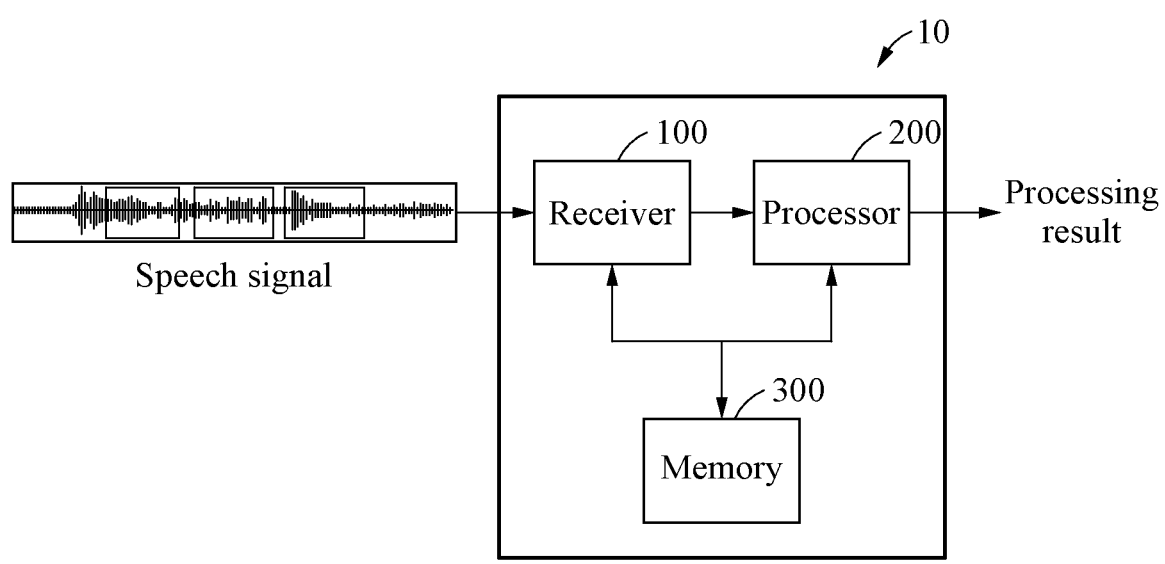
FIG. 1 is a diagram illustrating an example of a speech signal processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of a speech signal processing apparatus.

Referring to FIG. 1, a speech signal processing apparatus 10 may receive a speech signal, process the received speech signal, and output a result of the processing. For example, the speech signal processing apparatus 10 may recognize the speech signal or translate the speech signal. In this example, the result of the processing may include a text or a speech.

The speech signal processing apparatus 10 may improve the performance of speech recognition by processing the speech signal. In an example, the speech signal processing apparatus 10 may improve the performance of speech recognition by adjusting a probability corresponding to at least one token using a neural network.

The speech signal processing apparatus 10 may process the speech signal through end-to-end automatic speech recognition (ASR).

The end-to-end ASR may include a sequence-to-sequence speech signal processing method, for example. The end-to-end ASR will be described in detail with reference to FIG. 2.

The speech signal processing apparatus 10 may process the speech signal using the neural network. The neural network, or an artificial neural network, may include a statistical learning algorithm that has an ability to solve a problem, the statistical learning algorithm including artificial neurons (nodes) that forms a network through synaptic combinations and changes a connection strength of the synapses through training. The neural network may indicate an overall model having a problem-solving ability as artificial neurons or nodes constituting a network through synaptic connections change an intensity of the synaptic connections through learning. In the neural network, each neuron may multiply an input value by a weight and add a bias, and then apply an activation function to obtain an output value. The activation function may determine a form of a value that passes through such artificial neural network.

The neural network may include a plurality of layers. The plurality of layers may include an input layer, at least one hidden layer, and an output layer. In an example, neural network may include a sub-sampling layer, a pooling layer, a fully connected layer, etc., in addition to a convolution layer. The neural network may map input data and output data that have a nonlinear relationship based on deep learning to perform tasks such as, for example, speech recognition.

The neural network may be trained to perform a desired operation by mapping input data and output data that have a nonlinear relationship therebetween through deep learning to perform various tasks. The deep learning is a machine learning method used to solve a problem given from a big dataset. The deep learning may also be construed as a problem-solving process for optimization to find a point where energy is minimized while training the neural network using provided training data. Through deep learning, for example, supervised or unsupervised learning, a weight corresponding to an architecture or a model of the neural network may be obtained, and the input data and the output data may be mapped to each other based on the obtained weight. In an example, a parameter of each of the nodes of the neural network may be adjusted while an error of a result output by the output layer is propagated backward along the neural network.

The neural network may include a deep neural network (DNN). For example, the neural network may include a convolutional neural network (CNN), a recurrent neural network (RNN), a perceptron, a feedforward (FF) network, a radial basis function (RBF) network, a deep FF (DFF) network, a long short-term memory (LSTM), a gated recurrent unit (GRU), an autoencoder (AE), a variational AE (VAE), a denoising AE (DAE), a sparse AE (SAE), a Markov chain (MC), a Hopfield network (HN), a Boltzmann machine (BM), a restricted BM (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The speech signal processing apparatus 10 may be used in various technical fields that adjust a mismatch of some tokens occurring due to a difference in an input received through an ensemble of a sequence-to-sequence model, in addition to speech recognition.

For example, the speech signal processing apparatus 10 may be used when a translation algorithm or an image caption algorithm and a language model are used together, and for text generation using an ensemble model.

As illustrated, the speech signal processing apparatus 10 includes a receiver 100 and a processor 200. The speech signal processing apparatus 10 further includes a memory 300.

The receiver 100 may receive an input token that is based on a speech signal. The receiver 100 may include hardware or a receiving interface, for example, a microphone. The receiver 100 may receive the speech signal and generate the input token.

A token described herein may indicate a tokenized corpus including a natural language. The receiver 100 may tokenize a corpus based on a criterion.

The receiver 100 may tokenize the corpus based on a set of characters having a meaning. For example, the receiver 100 may tokenize the corpus based on a unit, for example, a phoneme, a syllable, and a word.

The receiver 100 may receive a token sequence. A token sequence described herein may indicate a set of tokens received in at least one time period. The receiver 100 may output the input token and/or a sequence of the input token to the processor 200.

The processor 200 may process data stored in the memory 300. The processor 200 may execute a computer-readable code (e.g., software) stored in the memory 300 and instructions induced by the processor 200.

The processor 200 may be a data processing device embodied by hardware having a circuit of a physical structure to execute desired operations. The desired operations may include a code or instructions included in a program, for example.

The data processing device embodied by hardware may include, for example, a microprocessor, a central processing unit (CPU), a processor core, a multicore processor, a multiprocessor, an application-specific integrated circuit (ASIC), and a field-programmable gate array (FPGA). Further details regarding the processor is provided below.

The processor 200 may process the input token using the neural network. The processor 200 may train the neural network. The processor 200 may process the input token using the trained neural network.

In an example, the processor 200 may calculate a plurality of first probability values respectively corresponding to a plurality of candidate output tokens based on the received input token. A candidate output token described herein may indicate a subsequent token to be output following the input token. A candidate output token may have a corresponding first probability value. A probability corresponding to a candidate output token may refer to a probability of the candidate output token being an output token.

The processor 200 may determine an output token based on the first probability values corresponding to the candidate output tokens. The processor 200 may calculate the first probability values using the neural network that has an encoder and decoder structure. The calculating of the first probability values by the processor 200 will be described in detail with reference to FIG. 2.

The processor 200 may adjust at least one of the first probability values based on a priority of each of the first probability values. A priority described herein may indicate a ranking of each probability value in the order of magnitudes of probability values. For example, the priority may indicate a ranking of a magnitude of a logarithmic value of each probability value.

A greater probability value may have a higher priority, and a smaller probability value may have a lower priority. The higher priority may be indicated by a smaller number. That is, for example, a first priority may indicate the highest priority. The greatest probability value may have the first priority.

The processor 200 may determine whether a first probability value corresponding to a first candidate output token among the candidate output tokens is included in a priority. For example, the first candidate output token may be a token corresponding to an end of a sentence ("EOS"). Hereinafter, the token corresponding to EOS will be referred to as an EOS token.

The processor 200 may adjust the first probability value based on a result of the determining. In response to the first probability value not being included in a predetermined priority, the processor 200 may decrease the first probability value. In another example, in response to the first probability value being included in the predetermined priority, the processor 200 may determine the first probability value to be the output token without the adjusting.

The inclusion of the first probability value in the predetermined priority may indicate that a ranking of a magnitude of the first probability value is greater than or equal to the predetermined priority. The exclusion of the first probability value from the predetermined priority may indicate that the ranking of the magnitude of the first probability value is less than the predetermined priority.

In other words, the inclusion of the first probability value in the predetermined priority may indicate that the first probability value is greater than or equal to a probability value corresponding to the predetermined priority. The exclusion of the first probability value in the predetermined priority may indicate that the first probability value is less than the probability value corresponding to the predetermined priority.

In response to the first probability value being included in the predetermined priority, the processor 200 may adjust a logarithmic value of the first probability value to negative infinity. That is, the processor 200 may adjust the first probability value to 0.

The processor 200 may process the speech signal based on an adjusted probability value. For example, the processor 200 may output a text based on the speech signal using the adjusted probability value. The text may include a result of recognizing the speech signal or a result of translating the speech signal.

The processor 200 may calculate a plurality of second probability values respectively corresponding to a plurality of candidate output tokens based on the input token. Hereinafter, a probability corresponding to a plurality of first candidate output tokens will be referred to as a first probability, and a probability corresponding to a plurality of second candidate output tokens will be referred to as a second probability.

That is, the processor 200 may calculate the first probability values corresponding to the first candidate output tokens based on the input token, and calculate the second probability values corresponding to the second candidate output tokens based on the input token.

The processor 200 may generate a nonverbal token and a probability corresponding to the nonverbal token based on at least one of the first probability values and the second probability values. A nonverbal token described herein may indicate a token corresponding to a signal that is included in a speech signal although not being a natural language. A nonverbal token may include a token corresponding to a non-speech verbal sound or an acoustic event. For example, a nonverbal token may include a token corresponding to a speech signal, for example, cough, silence, exclamation (e.g., hmm), and the like.

The processor 200 may determine whether the nonverbal token is registered among the second candidate output tokens. In response to a determination that the nonverbal token is not registered among the second candidate output tokens, the processor 200 may generate the nonverbal token in the second candidate output tokens.

The processor 200 may generate the nonverbal token and the probability corresponding to the nonverbal token through duplication or mapping. For example, the processor 200 may duplicate a nonverbal token included in the first candidate output tokens into the second candidate output tokens.

The processor 200 may duplicate a probability corresponding to the nonverbal token included in the first probability values into the second probability values. In another example, the processor 200 may map a greatest value among the second probability values to a probability corresponding to the duplicated nonverbal token.

Depending on examples, the probability corresponding to the nonverbal token may be generated through various methods in addition to the duplication and the mapping.

The processor 200 may determine the output token based on the first probability values and the second probability values.

In an example, the calculating of the first probability values and the calculating of the second probability values may be performed using different neural networks. The calculating of the first and second probability values will be described in detail with reference to FIG. 3.

The processor 200 may obtain a weighted sum of each of the first probability values and the second probability values. The processor 200 may determine, to be the output token, a candidate output token having a greatest weighted sum among the candidate output tokens. The processor 200 may obtain a weighted sum of first probability values and second probability values corresponding to the same candidate output token.

An output token described herein may indicate a token that follows an input token in a successive token sequence. The processor 200 may continuously estimate an output token to output a sentence constructed by a token sequence.

The determining of the output token will be described in detail with reference to FIG. 3.

The memory 300 may store instructions (or a program) executable by the processor 200. For example, the instructions may include instructions to execute an operation of the processor 200 and/or an operation of each component of the processor 200.

The memory 300 may be embodied by a volatile or nonvolatile memory device.

The volatile memory device may be embodied by, for example, a dynamic random-access memory (DRAM), a static RAM (SRAM), a thyristor RAM (T-RAM), a zero-capacitor RAM (Z-RAM), or a twin-transistor RAM (TTRAM).

The nonvolatile memory device may be embodied by, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferro-electric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further details regarding the memory 300 is provided below.

Figure 2:
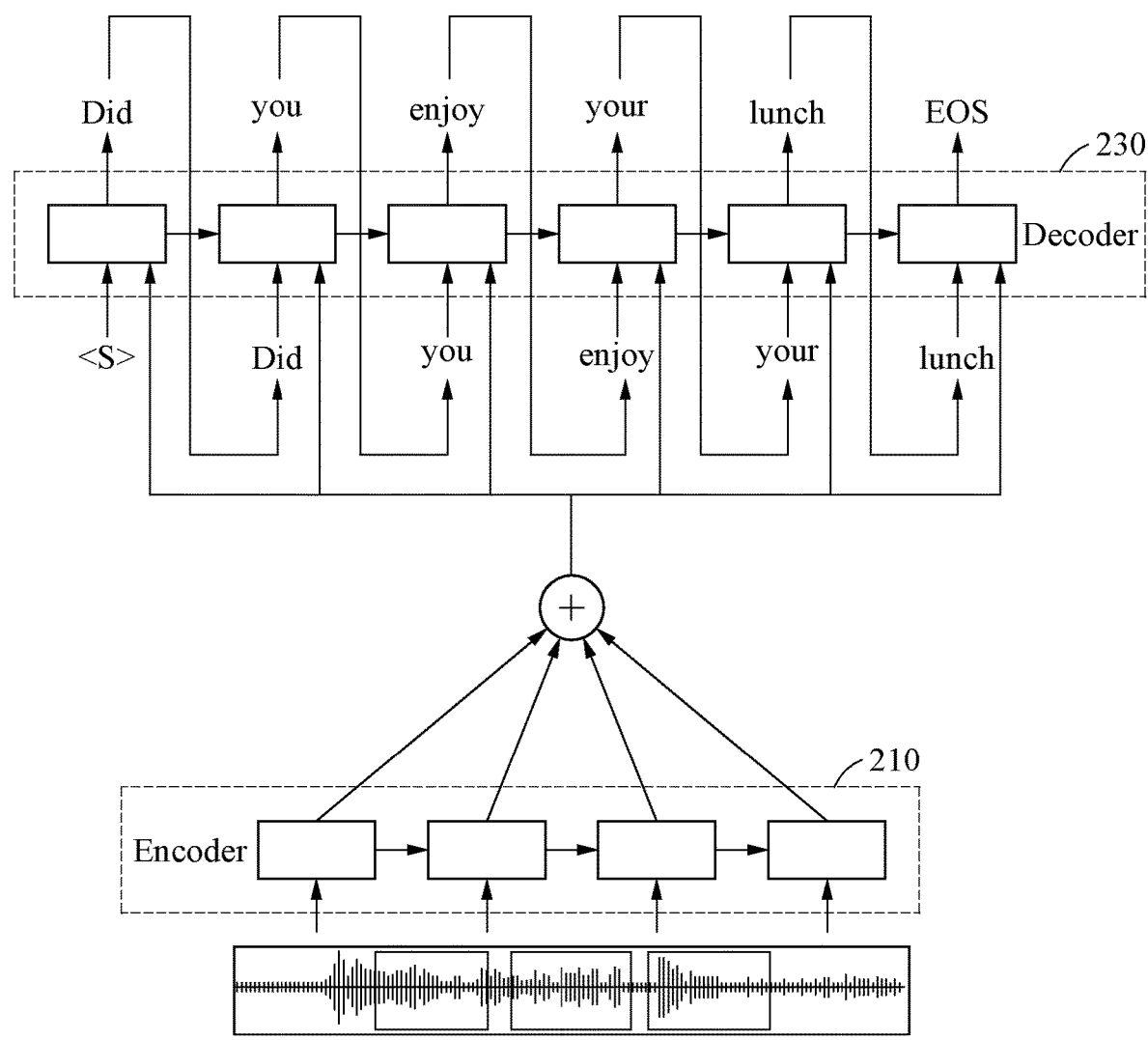
FIG. 2 is a diagram illustrating an example of processing a speech signal by the speech signal processing apparatus illustrated in FIG. 1.

FIG. 2 is a diagram illustrating an example of processing a speech signal by the speech signal processing apparatus 10 illustrated in FIG. 1.

Referring to FIG. 2, the processor 200 may process a speech signal using a neural network. The neural network used by the processor 200 includes an encoder 210 and a decoder 230.

The decoder 230 may receive an encoded feature as an input. For example, the decoder 230 may receive the input from the encoder 210 connected to a front end of the decoder 230 in the artificial neural network.

The encoder 210 and the decoder 230 may be embodied by a DNN, an RNN, or a recurrent DNN (RDNN). The encoder 210 and the decoder 230 may have a relationship in which nodes of layers in the encoder 210 and the decoder 230 nonlinearly affect one another. Parameters of the neural network, for example, values output from the nodes and relationships between the nodes, may be optimized by learning or training.

The encoder 210 and the decoder 230 may be in an integrated network structure that generates a sequence of a recognition result from a sequence of an input token. For example, the encoder 210 and the decoder 230 may be embodied in a sequence-to-sequence structure that may directly generate a recognition result corresponding to an input speech signal from the input speech signal. That is, the encoder 210 and the decoder 230 may be trained in advance to generate a sequence of a recognition result from an input sequence.

The encoder 210 may receive a speech signal and analyze the received speech signal. The decoder 230 may estimate a word piece subsequently connected to an existing history in each step.

The decoder 230 may output an EOS token after estimating an entire sentence corresponding to the entire speech signal. When the EOS token is given, the processor 200 may terminate decoding and then return a final speech recognition result to a user.

The encoder 210 may encode a sequence of an input token and generate an encoded feature. The encoder 210 may extract a feature from the sequence of the input token and generate encoded information. The encoded feature may be applied to the decoder 230. The decoder 230 may generate a recognition result based on the encoded feature.

The decoder 230 receiving the encoded feature may determine, to be an output token, one of a plurality of candidate output tokens based on the input token which is a start token. The decoder 230 may determine the determined output token to be a subsequent input token.

The decoder 230 may obtain the output token based on information calculated from the encoder 210 in each time step. The decoder 230 may obtain the output token depending on input tokens selected until a previous step.

In an example, the decoder 230 that determines the determined output token to be a new input token may predict respective probabilities of candidates for a subsequent output token based on the determined output token.

Figure 3:
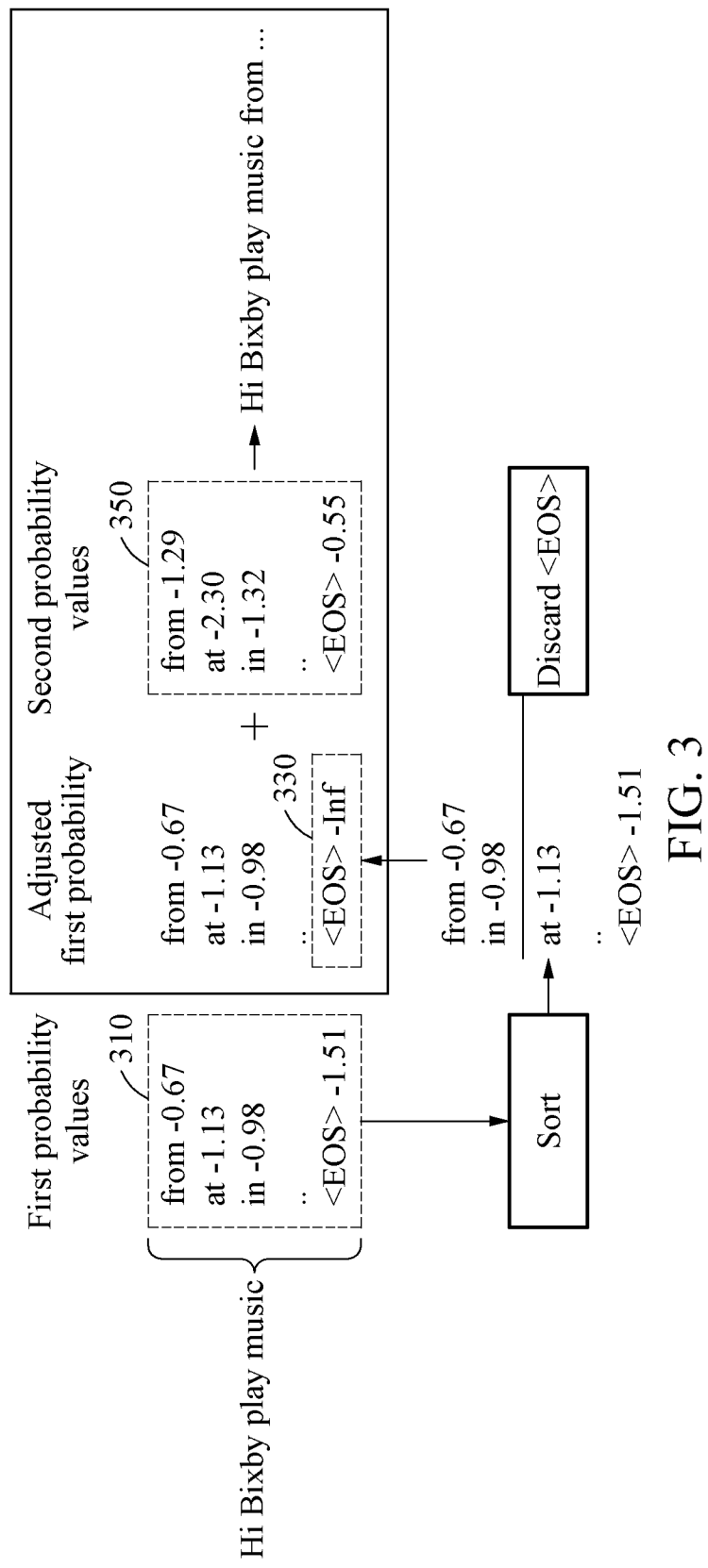
FIG. 3 is a diagram illustrating an example of adjusting a probability corresponding to a candidate output token by the speech signal processing apparatus illustrated in FIG. 1.

FIG. 3 is a diagram illustrating an example of adjusting a probability corresponding to a candidate output token by the speech signal processing apparatus 10 illustrated in FIG. 1.

Referring to FIG. 3, the processor 200 may use a second neural network including a neural language model to improve performance in recognition of various texts that are not included in a training corpus paired with speeches.

The second neural network including the language model outside a first neural network may help recognize some challenging cases that may not be easy for the first neural network to independently learn because there are not many pairs of speeches and texts. The cases may include, for example, a word that does not frequently appear in a corpus used by the first neural network, a context bias, and the like.

The processor 200 may combine an output of the first neural network and an output of the second neural network in various ways. For example, the processor 200 may use shallow-fusion to combine the outputs of the two networks by obtaining a weighted sum of the output of the first neural network and the output of the second neural network.

In this example, the processor 200 may adjust a probability value calculated by at least one of the first neural network or the second neural network, thereby improving performance in processing a speech signal.

Hereinafter, the combining of the output of the first neural network and the output of the second neural network will be described in detail.

Depending on examples, the first neural network and the second neural network may include various neural network models.

Hereinafter, for the convenience of description, it will be described that the first neural network includes a speech recognition model and the second neural network includes a language model. In another example, the first neural network may include the language model and the second neural network may include the speech recognition model. That is, one of the first neural network and the second neural network may include the speech recognition model, and the other one of the first neural network and the second neural network may include the language model. The processor 200 may depend on a probability value of the first neural network to determine a probability corresponding to a token (e.g., a first candidate output token) in the speech recognition model (e.g., an end-to-end speech recognition model) using the external language model as the second neural network.

In another example, the processor 200 may adjust a probability value of the second neural network to adjust a final probability value corresponding to the token that is calculated using the first neural network and the second neural network.

When a context is given in the speech recognition model, the processor 20 may calculate a log likelihood for each candidate output token and sort results of the calculating. When a token, for example, a first candidate output token, is not included in a predetermined priority as a result of the sorting, the processor 200 may adjust a probability value corresponding to the token such that the token is not included in a final beam.

Here, calculating a first probability and calculating a second probability may be performed using different neural networks. The processor 200 may calculate the first probability using the first neural network and calculate the second probability using the second neural network.

The first neural network and the second neural network may include at least one of the encoder 210 or the decoder 230. An operation of the encoder 210 and/or the decoder 230 included in the first neural network and the second neural network may be the same as described above with reference to FIG. 2, and thus a repeated and detailed description thereof will be omitted here for brevity.

The processor 200 may train the first neural network and the second neural network using different datasets. For example, the processor 200 may train the first neural network using a dataset in which speech and text are combined and train the second neural network using a dataset including text.

The processor 200 may determine an output token based on the first probability and the second probability.

For example, the first neural network may include the speech recognition model (e.g., end-to-end ASR) and the second neural network may include the language model (also indicated LM). In another example, as described above, the first neural network may include the language model and the second neural network model may include the speech recognition model.

The first neural network may use the encoder 210 and the decoder 230 described above with reference to FIG. 2 to calculate a plurality of probability values respectively corresponding to a plurality of candidate output tokens.

The first neural network may include the decoder 230 that outputs a sequence of a text (e.g., words) which is a recognition result by using a speech as an input of the encoder 210.

As needed, the second neural network may use a language model including only a decoder (not shown) that determines a probability of a succession of words in a sentence to increase performance in processing a speech signal.

The processor 200 may extract a speech feature from a speech signal. An input speech signal may be a speech signal including information for each of a plurality of frames, and a speech feature may be a sequence of information extracted in a unit of at least one frame and represented by a multidimensional vector.

In an example, the processor 200 may generate a sequence of a recognition result from a sequence of an input speech using an ensemble of the decoder 230 included in the first neural network and the decoder included in the second neural network.

In an example, the decoder 230 included in the first neural network and the decoder included in the second neural network may output respective recognition results in a unit of a token, and ensemble the recognition results based on a weight to generate a final recognition result.

For example, the decoder 230 included in the first neural network may determine a plurality of candidate output tokens based on an input speech signal and a previously determined recognition result. The decoder included in the second neural network may determine a plurality of candidate output tokens based on a previously determined recognition result. In this example, the processor 200 may ensemble the candidate output tokens based on an ensemble weight to generate a final recognition result.

The encoder 210 and the decoder 230 may be trained in advance to generate a sequence of a recognition result from a sequence of a pair of an input speech signal and a corresponding answer text. The decoder of the second neural network may be trained in advance to generate a sequence of a recognition result from a text sequence.

The encoder 210 may encode a speech feature and generate an encoded feature. The encoder 210 may change a dimension of the speech feature and generate encoded information.

The encoded feature may be applied to the decoder 230 of the first neural network. The decoder 230 may generate a plurality of candidate output tokens in a unit of a token based on the encoded feature and a previously determined recognition result. The decoder of the second neural network may generate a plurality of candidate output tokens in a unit of a token based on a previously determined recognition result.

The processor 200 may then generate a final recognition result by obtaining an ensembled result between a recognition result from the decoder 230 of the first neural network and a recognition result from the decoder of the second neural network based on a predetermined ensemble weight.

In the example of FIG. 3, first probability values 310 indicate a probability calculated by the first neural network, and second probability values 350 indicate a probability calculated by the second neural network.

The processor 200 sorts a plurality of first candidate output tokens and the first probability values 310 respectively corresponding to the first candidate output tokens. The processor 200 then adjusts at least one of the first probability values 310 based on a priority of each of the first probability values 310.

The processor 200 determines whether a first probability value corresponding to a first candidate output token among the first candidate output tokens is included in a predetermined priority.

In the example of FIG. 3, the first probability values 310 may be probability values respectively corresponding to a plurality of candidate output tokens. The probability values are indicated as logarithmic values of the probability values in FIG. 3.

For example, as illustrated, a logarithmic value of a probability value corresponding to a candidate output token "from" is −0.67. A logarithmic value of a probability value corresponding to a candidate output token "at" is −1.13. A logarithmic value of a probability value corresponding to a candidate output token "in" is −0.98. A logarithmic value of a probability value corresponding to an EOS token is −1.51.

The processor 200 obtains a priority of each of the first probability values 310 through the sorting. The processor 200 determines whether the first probability values 310 corresponding to the first candidate output tokens are included in the predetermined priority.

The predetermined priority may be experimentally determined, and thus may vary according to an example. The predetermined priority may be indicated as a natural number. In the example of FIG. 3, the predetermined priority is 2.

In response to the first probability value not being included in the predetermined priority, the processor 200 decreases the first probability value. For example, the processor 200 may adjust a logarithmic value of the first probability value to negative infinity.

In the example of FIG. 3, the first candidate output token is the EOS token. The logarithmic value of the first probability value corresponding to the EOS token is −1.51. Since the first probability value corresponding to the EOS token which is the first candidate output token is not included in the predetermined priority which is a second (2) priority, the processor 200 decreases the first probability value. For example, the processor 200 adjusts the logarithmic value of the first probability value corresponding to the EOS token to negative infinity and obtains an adjusted first probability value 330.

The processor 200 determines an output token based on the first probability values 310 and the second probability values 350. The processor 200 obtains a weighted sum of first probability values and the second probability values 350. The processor 200 determines, to be the output token, a candidate output token having a greatest weighted sum. Here, the first probability values may indicate probability values to which the adjusted first probability value 330 is applied.

As described above, the processor 200 calculates the second probability values 350 respectively corresponding to a plurality of second candidate output tokens. The processor 200 obtains a weighted sum of the first probability values to which the adjusted first probability value 330 is applied, and the second probability values 350.

When the probability value corresponding to the EOS token becomes negative infinity, the neural network may recognize that the sentence has not yet ended. When the EOS token is not included in the predetermined priority, the processor 200 may adjust the probability value corresponding to the EOS token to negative infinity, and adjust a result of the weighted sum to be a sufficiently small value, for example, a negative value having a sufficiently large absolute value.

In another example, the processor 200 may adjust a weighted sum probability value by adjusting a probability value calculated by the second neural network.

The processor 200 may determine whether a first candidate output token is included in the predetermined priority. When a probability value corresponding to the first candidate output token is not included in the predetermined priority, the processor 200 may adjust a second probability value corresponding to the first candidate output token, for example, a probability value corresponding to an EOS token of the second neural network. For example, the processor 200 may adjust a logarithmic value of the second probability value corresponding to the first candidate output token to negative infinity.

Through this, the processor 200 may adjust a weighted sum of a probability value calculated through the first neural network and a probability value calculated through the second neural network, and thus adjust a final output probability of the first candidate output token.

In another example, the processor 200 may exclude the first candidate output token from the first neural network or the second neural network. Through this, the first candidate output token may be prevented from being included in a final output, and thus the final output may not be recognized as an end of a sentence. Through the methods described above, the processor 200 may receive an additional input token by preventing a sentence from being ended by a current input token. That is, the processor 200 may adjust a probability value corresponding to an EOS token, and thus solve an issue that a point that is not an end of an actual speech signal is recognized as an end of a sentence.

Hereinafter, processing a speech signal including a nonverbal token by the processor 200 will be described in detail with reference to FIG. 4.

Figure 4:
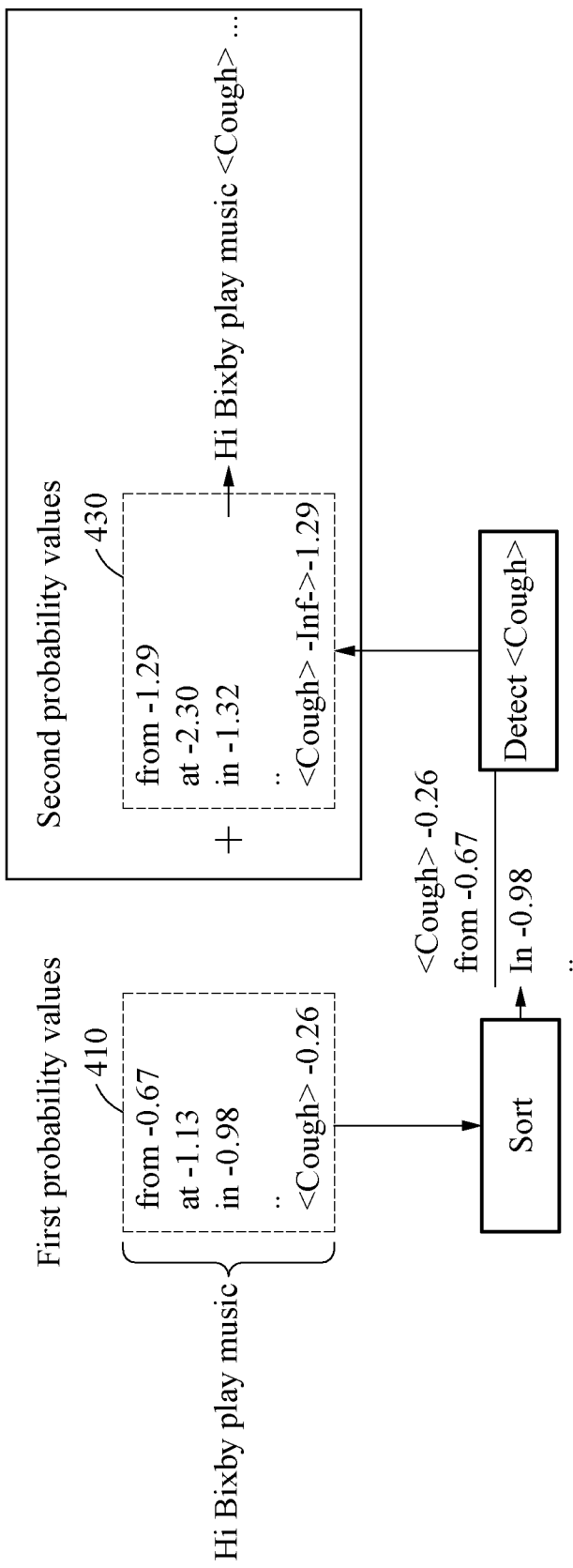
FIG. 4 is a diagram illustrating an example of generating a probability corresponding to a nonverbal token by the speech signal processing apparatus illustrated in FIG. 1.

FIG. 4 is a diagram illustrating an example of generating a probability corresponding to a nonverbal token by the speech signal processing apparatus 10 illustrated in FIG. 1.

Referring to FIG. 4, to recognize a speech signal including a nonverbal symbol that is not estimated only by a language model, the processor 200 may determine whether a nonverbal token is registered in a speech recognition model, for example, beam registration. When the nonverbal token is not registered, the processor 200 may generate the nonverbal token and a probability corresponding to the nonverbal token.

Hereinafter, determining a nonverbal token and a corresponding probability by the processor 200 will be described in detail.

As illustrated, the processor 200 calculates first probability values 410 respectively corresponding to first candidate output tokens based on an input token. The processor 200 calculates second probability values 430 respectively corresponding to second candidate output tokens based on the input token.

The calculating of the first probability values 410 and the second probability values 430 by the processor 200 may be the same as described above with reference to FIG. 3, and thus a repeated and detailed description thereof will be omitted here for brevity.

The processor 200 generates a nonverbal token and a probability corresponding to the nonverbal token based on at least one of the first probability values 410 and the second probability values 430.

In an example, the processor 200 duplicates a nonverbal token included in the first candidate output tokens into the second candidate output tokens. The first candidate output tokens may indicate candidate output tokens used in a first neural network.

A candidate output token may include a verbal token and a nonverbal token. In the example of FIG. 4, the first candidate output tokens include "from," "at," "in," . . . , and a cough. Among these, "from," "at," and "in" are verbal tokens, and the cough is a nonverbal token.

The processor 200 may calculate a probability value of a nonverbal token by training the first neural network using a dataset in which a text and a speech signal are combined.

However, since a second neural network is trained only using a text, the second neural network may not have a token corresponding to a nonverbal speech signal and a probability value corresponding to the token.

The processor 200 determines whether the nonverbal token is registered in the second candidate output tokens. In response to a determination that the nonverbal token is not registered in the second candidate output tokens, the processor 200 generates the nonverbal token.

The processor 200 generates the nonverbal token and the corresponding probability value in the second neural network based on the nonverbal token and the corresponding probability value in the first neural network.

For example, the processor 200 duplicates the nonverbal token included in the first candidate output tokens into the second candidate output tokens. In the example of FIG. 4, the processor 200 duplicates a probability corresponding to the nonverbal token included in the first probability values 410 into the second probability values 430.

The processor 200 duplicates the nonverbal token, which is <cough> in the example of FIG. 4, from among the first candidate output tokens into the second candidate output tokens. In addition, the processor 200 duplicates, into the second probability values 430, a logarithmic value (e.g., −0.26) of a probability value corresponding to the <cough> token among the first probability values 410.

Thus, the processor 200 generates the nonverbal token and the corresponding probability values in the second neural network.

In another example, the processor 200 maps one of the second probability values 430 to a duplicated candidate output token. For example, the processor 200 may map a greatest value among the second probability values 430 to the probability corresponding to the duplicated nonverbal token.

The processor 200 processes the speech signal based on the probability corresponding to the nonverbal token. Here, determining an output token using the first probability values 410 and the second probability values 430 by the processor 200 may be the same as described above with reference to FIG. 3, and thus a repeated and detailed description thereof will be omitted for brevity.

Figure 5:
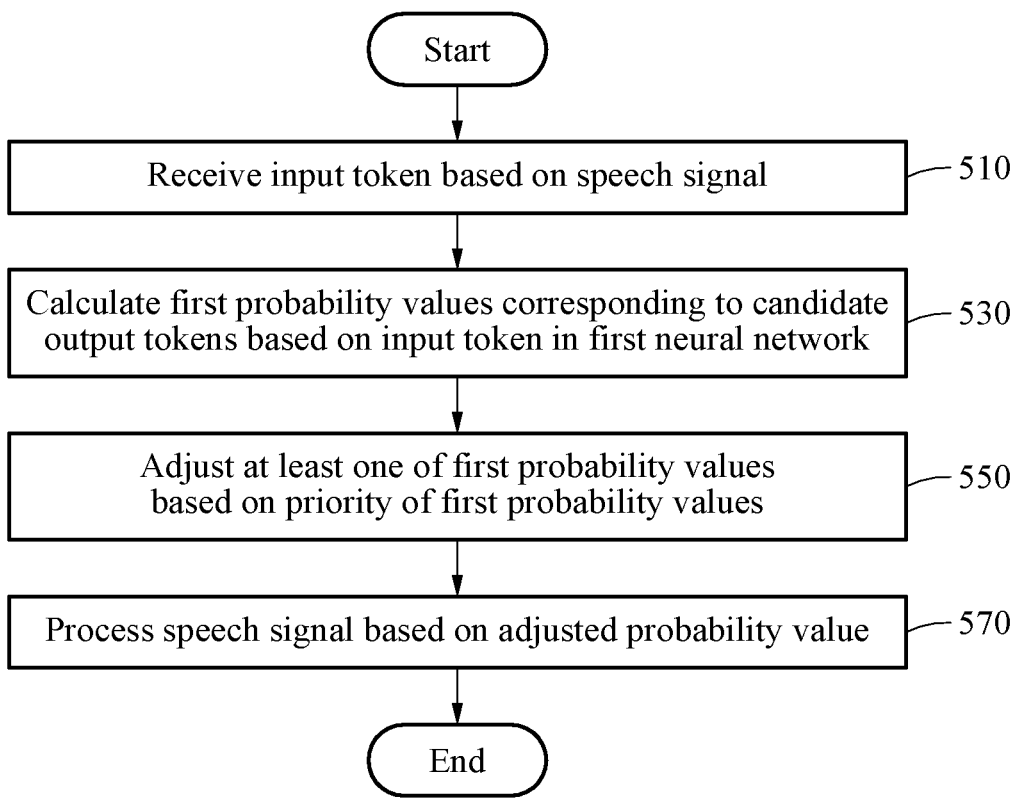
FIG. 5 is a diagram illustrating an example of a sequence of operations performed by the speech signal processing apparatus illustrated in FIG. 1.

FIG. 5 is a diagram illustrating an example of a sequence of operations performed by the speech signal processing apparatus 10 illustrated in FIG. 1. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the receiver 100 receives an input token that is based on a speech signal.

In operation 530, the processor 200 calculates a plurality of first probability values (e.g., the first probability values 310) corresponding to a plurality of candidate output tokens based on the input token, in a first neural network. The calculating of the first probability values is the same as described above with reference to FIGS. 2 and 3.

In operation 550, the processor 200 adjusts at least one of the first probability values based on a priority of each of the first probability values. For example, the processor 200 may determine whether a first probability value corresponding to a first candidate output token from among the candidate output tokens is included in a predetermined priority.

The processor 200 may adjust the first probability value based on a result of the determining. In an example, when the first probability value is not included in the predetermined priority, the processor 200 may decrease the first probability value. In an example, when the first probability value is not included in the predetermined priority, the processor 200 may adjust a logarithmic value of the first probability value to negative infinity.

In operation 570, the processor 200 processes the speech signal based on an adjusted probability value (e.g., the adjusted probability value 330). For example, the processor 200 may calculate a plurality of second probability values corresponding to a plurality of candidate output tokens based on the input token.

The processor 200 may generate a nonverbal token and a probability corresponding to the nonverbal token based on at least one of the first probability values and the second probability values.

The processor 200 may determine whether a nonverbal token is registered in a plurality of second output tokens. The processor 200 may duplicate the nonverbal token included in the first candidate output tokens into the second candidate output tokens.

In an example, the processor 200 may duplicate a probability corresponding to the nonverbal token included in the first probability values into the second probability values. In another example, the processor 200 may map a greatest value among the second probability values to the probability corresponding to the duplicated nonverbal token.

The processor 200 may determine an output token based on the first probability values and the second probability values.

The processor 200 may obtain a weighted sum of each of the first probability values and the second probability values. The processor 200 may determine, to be the output token, a candidate output token having a greatest weighted sum among the candidate output tokens.

Figure 6:
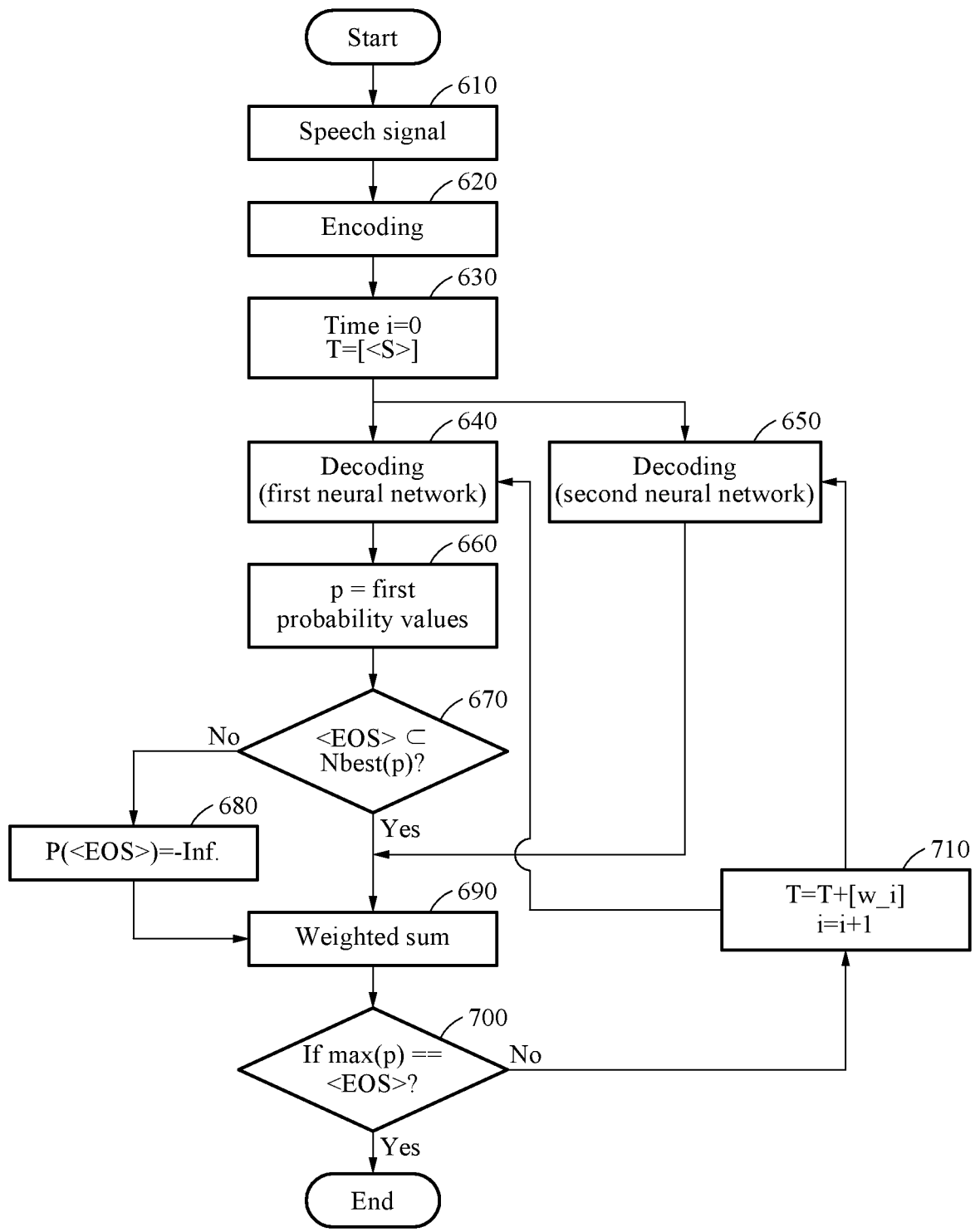
FIG. 6 is a diagram illustrating an example of a speech signal processing method.

FIG. 6 is a diagram illustrating an example of a speech signal processing method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, the processor 200 may process a speech signal by combining a plurality of neural networks. For example, the processor 200 may process the speech signal using a first neural network and a second neural network.

In an example, the first neural network may include a speech recognition model, and the second neural network may include a language model.

When combining a probability of the speech recognition model (e.g., end-to-end ASR) and a probability of the external language model, the processor 200 may consider tokens that may not be readily estimated by the language model, and sort only probability values of the speech recognition model for the tokens that are not readily estimated by the language model and determine whether to make an output based on this.

The processor 200 may process the speech signal using a search algorithm. The search algorithm may include a greedy search algorithm and a beam search algorithm.

Although the example of FIG. 6 will be described based on the greedy search algorithm, the processor 200 may also process the speech signal using other algorithms, such as the beam search algorithm.

In a case of using the beam search algorithm, the processor 200 may determine whether to leave candidate output tokens in a beam by sorting probability values. The processor 200 may configure the beam by adjusting a probability corresponding to a candidate output token of the speech recognition model or the language model based on a criterion for the determining.

For example, the processor 200 may determine whether a probability value of a certain token among a plurality of candidate output tokens is included in a predetermined priority, before obtaining a weighted sum of each of first probability values (e.g., the first probability values 410) and second probability values (e.g., the second probability values 430). In this example, when the predetermined priority is N, the probability value included in the predetermined priority may be represented as a probability value being an N-best probability value.

The processor 200 may adjust the probability value of the token based on a result of the determining and determine whether the token is to be included in the beam.

For example, as illustrated, in operation 610, the receiver 100 receives an input token that is based on a speech signal. In operation 620, the processor 200 encodes the received input token through the encoder 210.

In operation 630, the processor 200 assigns <S> to T, a time at which i=0.

In operation 640, the processor 200 performs decoding using the decoder 230 of the first neural network. In operation 650, the processor 200 performs decoding using the decoder of the second neural network. The processor 200 may calculate second probability values using the second neural network.

The decoding may be performed independently in the first neural network and the second neural network. For example, the speech recognition model and the external language model may independently estimate probability values corresponding to candidate output tokens.

In operation 660, the processor 200 calculates first probability values (e.g., the first probability values 310) using the first neural network. In operation 670, the processor 200 determines whether a first probability value corresponding to a first candidate output token (e.g., an EOS token) from among a plurality of first candidate output tokens is included in a predetermined priority, or N-best.

In operation 680, when the first probability value is not included in the predetermined priority, the processor 200 adjusts a logarithmic value of the first probability value to negative infinity.

Thus, the processor 200 may solve an issue that, when recognizing a long sentence, the recognition discontinues or is disconnected in the middle of a sentence by preventing the first candidate output token from being selected as a beam.

In operation 690, the processor 200 calculates a weighted sum of the first probability values (e.g., the first probability values 310) including an adjusted first probability value (e.g., the first probability value 330), and second probability values (e.g., the second probability values 350). Here, the processor 200 may obtain the weighted sum using a predetermined hyper-parameter.

In operation 700, the processor 200 determines whether a probability value corresponding to an EOS token is a maximum probability value. When the probability value corresponding to the EOS token is the maximum probability value, the processor 200 terminates estimation. In operation 710, when the probability value corresponding to the EOS token is not the maximum probability value, the processor 200 continues, for example, i=i+1 and T=T+[w_i].

The processor 200 may repeat operations 640 and 650 to determine an output token at a subsequent time.

The speech signal processing apparatus 10, receiver 100, and other apparatuses, devices, units, modules, and components described herein with respect to FIG. 1 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the speech signal processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A speech signal processing method, comprising:
   receiving an input token that is based on a speech signal, the input token being a portion of a speech;
   calculating, based on the input token, a plurality of first probability values respectively corresponding to a plurality of candidate output tokens, each first probability value indicates a probability that a respective candidate output token being a subsequent token to the input token;
   adjusting, based on a priority of each first probability value, at least one of the first probability values; and
   processing, based on the adjusted probability value, the speech signal.

2. The speech signal processing method of claim 1, wherein the adjusting of the first probability value comprises:
   determining whether a first probability value of the plurality of first probability values is included in a predetermined priority; and
   adjusting the first probability value based on a result of the determining.

3. The speech signal processing method of claim 2, wherein the first candidate output token is a token corresponding to an end of a sentence.

4. The speech signal processing method of claim 2, wherein the adjusting of the first probability value comprises:
   decreasing the first probability value, in response to the first probability value not being included in the predetermined priority.

5. The speech signal processing method of claim 4, wherein the decreasing of the first probability value comprises:
   adjusting a logarithmic value of the first probability value to negative infinity.

6. The speech signal processing method of claim 1, further comprising
   outputting, based on the speech signal, a text that is subsequent to the portion of the speech.

7. The speech signal processing method of claim 1, further comprising:
   calculating, based on the input token, a plurality of second probability values respectively corresponding to a plurality of candidate output tokens; and
   determining, based on the first probability values and the second probability values, an output token.

8. The speech signal processing method of claim 7, wherein the determining of the output token comprises:
   obtaining a weighted sum of each of the first probability values and each of the second probability values; and
   determining, to be the output token, a candidate output token having a greatest weighted sum from among the candidate output tokens.

9. A speech signal processing apparatus, comprising:
   a microphone configured to receive an input token that is based on a speech signal; and
   a processor configured to
      calculate, based on the input token, a plurality of first probability values respectively corresponding to a plurality of candidate output tokens each first probability value indicates a probability that a respective candidate output token being a subsequent token to the input token, adjust, based on a priority of each of the first probability values, at least one of the first probability values, and process, based on an adjusted probability value, the speech signal.

10. The speech signal processing apparatus of claim 9, wherein the processor is further configured to:

determine whether a first probability value of the plurality of first probability values is included in a predetermined priority; and adjust the first probability value based on a result of the determining.

11. The speech signal processing apparatus of claim 10, wherein the first candidate output token is a token corresponding to an end of a sentence.

12. The speech signal processing apparatus of claim 10, wherein the processor is further configured to:

decrease the first probability value, in response to the first probability value not being included in the predetermined priority.

13. The speech signal processing apparatus of claim 12, wherein the processor is further configured to:

adjust a logarithmic value of the first probability value to negative infinity.

14. The speech signal processing apparatus of claim 9, wherein the processor is further configured to:

output, based on the speech signal, a text that is subsequent to the portion of the speech.

15. The speech signal processing apparatus of claim 9, wherein the processor is further configured to:

calculate, based on the input token, a plurality of second probability values respectively corresponding to a plurality of candidate output tokens; and determine, based on the plurality of first probability values and the plurality of second probability values, an output token.

16. The speech signal processing apparatus of claim 15, wherein the processor is further configured to:

obtain a weighted sum of each of the first probability values and each of the second probability values; and determine, to be the output token, a candidate output token having a greatest weighted sum among the candidate output tokens.

17. A speech signal processing method, comprising:

receiving, based on a speech signal, an input token that is a portion of a speech;

calculating, based on the input token, a plurality of first probability values respectively corresponding to a plurality of first candidate output tokens, each first probability values indicates a probability that a respective candidate output token being a subsequent token to the input token;

calculating, based on the input token, a plurality of second probability values respectively corresponding to a plurality of second candidate output tokens;

generating, based on at least one of the first probability values and the second probability values, a nonverbal token;

generating, based on at least one of the first probability values and the second probability values, a probability corresponding to the nonverbal token; and processing, based on the probability corresponding to the nonverbal token, the speech signal.

18. The speech signal processing method of claim 17, wherein the generating comprises:

duplicating, into the plurality of second candidate output tokens, a nonverbal token included in the plurality of first candidate output tokens; and duplicating, into the plurality of second probability values, a probability corresponding to the nonverbal token and included in the plurality of first probability values.

19. The speech signal processing method of claim 17, wherein the generating comprises:

duplicating, into the plurality of second candidate output tokens, a nonverbal token included in the plurality of first candidate output tokens; and mapping a greatest value among the plurality of second probability values to a probability corresponding to the duplicated nonverbal token.

20. The speech signal processing method of claim 17, further comprising:

determining whether the nonverbal token is registered among the plurality second candidate output tokens.

21. A speech signal processing method, comprising:

receiving an input token that is based on a speech signal;

determining, using a first neural network, first probability values respectively corresponding to first candidate output tokens based on the input token;

determining, using a second neural network, second probability values respectively corresponding to second candidate output tokens based on the input token;

determining whether a first probability value corresponding to a first candidate output token from among the first candidate output tokens is included in a predetermined priority, obtaining a weighted sum of each of the first probability values and each of the second probability values, in response to the first probability value being included in the predetermined priority; and processing the speech signal based on the weighted sum to output a text, wherein the first neural network is based on a language model, and the second neural network is based on a speech recognition model.

22. The speech signal processing method of claim 21, further comprising:

adjusting a logarithmic value of the first probability value to negative infinity, in response to the first probability value not being included in the predetermined priority.

23. The speech signal processing method of claim 21, further comprising:

adjusting at least one of the first probability values based on a priority of each of the first probability values.

* * * * *